United States Patent [19]

Stottmann et al.

[11] Patent Number: 5,037,033
[45] Date of Patent: Aug. 6, 1991

[54] REMOVABLE INTERLOCK FOR FOOD PROCESSOR

[75] Inventors: Richard L. Stottmann, Louisville, Ky.; Edward F. Ponikwia, Dayton, Ohio

[73] Assignee: Whirlpool Corporation, Benton Harbor, Mich.

[21] Appl. No.: 141,450

[22] Filed: Jan. 7, 1988

[51] Int. Cl.$^5$ .............................................. B02C 25/00
[52] U.S. Cl. .................................... 241/37.5; 241/92
[58] Field of Search ................ 366/601; 241/36, 37.5, 241/92, 282.1, 282.2, 285 R, 285 A, 285 B

[56] References Cited

U.S. PATENT DOCUMENTS

| | | | |
|---|---|---|---|
| 4,216,917 | 8/1980 | Clare et al. | 241/37.5 |
| 4,226,373 | 10/1980 | Williams | 241/37.5 |
| 4,506,836 | 3/1985 | Williams | 241/37.5 |
| 4,600,155 | 7/1986 | Bos et al. | 241/37.5 |
| 4,614,306 | 9/1986 | Doggett | 241/37.5 |
| 4,700,901 | 10/1987 | McClean | 241/37.5 |

Primary Examiner—Mark Rosenbaum
Attorney, Agent, or Firm—Biebel & French

[57] ABSTRACT

An improved safety interlock is provided for operating a control switch which enables operator activation of a drive motor of a food processor. The safety interlock comprises an axially movable interlock rod for operating the control switch upon movement of the rod in a first direction. A coil spring is provided for resiliently forcing the interlock rod in the direction opposite to the first direction such that the control switch is normally unoperated. A generally U-shaped channel member receives the interlock rod and coil spring to properly align the interlock rod with the control switch. The channel member is removably connected to the food processor such that the channel member, interlock rod and coil spring can be removed for cleaning or replacement. The U-shaped channel member includes flanges outwardly extending from its open side which are received into first and second tracks on the food processor. Locking tabs at one end of the tracks are frictionally engaged by a notched extension on the channel member to secure the channel member to the food processor. Offset fingers extend beyond one or both surfaces of the flanges to stabilize the flanges within the tracks, yet permit movement and a rocking action within the tracks to facilitate assembly and removal of the channel member from the food processor.

4 Claims, 5 Drawing Sheets

REMOVABLE INTERLOCK FOR FOOD PROCESSOR

BACKGROUND OF THE INVENTION

This invention relates generally to food processors, and more particularly, to an interlock housing on a food processor which can be removed for cleaning or replacement of an interlock activating rod, an associated biasing spring or the housing itself.

Food processors are a well known convenience for preparing food by slicing, grating, shredding or similar food processing operations. A conventional form of food processor includes a working bowl having a motor-driven shaft projecting upwardly in the center of the bowl. A variety of food processing tools are coupled to the shaft and rotated to perform a corresponding variety of food processing operations as required by the operator of the food processor.

A detachable bowl cover is secured to the working bowl during operation of the food processor. The bowl cover defines a feed tube for introducing food items to be processed through the bowl cover into the bowl. Foods to be processed are placed into the feed tube and then pushed through the tube into engagement with a processing tool by means of a food pusher which is formed to be slidingly inserted into the feed tube.

A safety interlock is provided to prevent the food processor from operating until the bowl cover is firmly secured to the bowl in its proper operating position. While the interlock can be performed in a variety of ways, commonly a vertically movable rod is positioned within a channel formed on the side of the working bowl, and spring-biased to the upper end of the channel. When the bowl is properly positioned and secured to a food processor base, the rod is aligned with an actuating pin of an interlock switch such that when a bowl cover is latched or secured to the bowl, the pin is depressed against the force of the spring to operate the interlock switch.

If the food processor includes an enlarged feed tube, a feed tube cover is also provided and coupled into the interlock system such that the food processor cannot be operated unless the feed tube cover is also secured in its proper position. For operation with a feed tube cover, a second interlock activating rod may be positioned within a channel formed on the bowl cover such that the two interlock rods are aligned with one another to extend an operating cam to activate the interlock switch within the base of the food processor.

Generally, an interlock rod is recessed and protected by a portion of the bowl or bowl cover; however, the rod or rods can be extended while the bowl or cover are off the food processor. If the rod or rods are thus extended beyond normally protecting structure, they are vulnerable to being snapped off during handling. When this occurs, the working bowl or bowl cover must be replaced.

An additional problem associated with permanently enclosed interlock rods on presently available food processors is that juices or small portions of processed food can get into the interlock rods to discolor and contaminate them. Since the interlock rods cannot be thoroughly cleaned, such contamination can interfer with the proper operation of the interlocks. Of even more importance, this contamination can lead to various growths of mold, bacteria and the like which not only detract from the appearance of the food processor, but also may create a health hazard.

It is thus apparent that the need exists for an improved safety interlock for operating a control switch in a food processor which permits an enclosed interlock rod and the enclosing channel to be thoroughly cleaned, and further provides for the replacement of the channel, the interlock rod or biasing spring in the event one of these parts becomes damaged or worn during the life of the food processor.

SUMMARY OF THE INVENTION

The problems of the prior art are overcome by the present invention which provides an improved safety interlock which is removable by the operator of the food processor. According to one aspect of the present invention, an improved safety interlock is provided for operating control means which enable the operation of a drive motor of the food processor. The safety interlock comprises an axially movable interlock rod for operating the control means to enable operation of the drive motor upon movement of the rod in a first direction. Spring means are provided for resiliently forcing the interlock rod in the direction opposite to the first direction such that the control means is normally unoperated. Channel means receive the interlock rod and spring means to properly align the interlock rod with the control means. The channel means is removably connected to the food processor such that the interlock rod and spring means can be removed for cleaning or replacement.

Preferably, the channel means comprises a generally U-shaped member having flanges outwardly extending from its open side, and the food processor includes first and second tracks for receiving the flanges to connect the channel means to the food processor. To secure the channel means to the food processor, locking tab means are provided at one end of the tracks. The channel means further comprises a notched extension at one end for frictionally engaging the locking tab means, and an operating extension at its opposite end for operation of the safety interlock. For removal of the channel means, the notched extension is disengaged from the locking tab means by a rocking action created by applying force to the operating extension. To facilitate the rocking action of the channel means and to reduce relative vibration between the channel means and the food processor, the flanges may include offset fingers extending beyond one or both surfaces of the flanges to stabilize the flanges within the tracks, yet permit movement of the flanges within the tracks.

The interlock rod preferably comprises a central web portion having upper and lower centering flanges thereon, with the upper and lower flanges being shaped to generally correspond to the interior of the channel means. A first pin extends upwardly from the upper flange and a second pin extends downwardly from the second flange. The second pin is sized to receive the spring means which preferably comprises a coiled compression spring. In accordance with this construction of the interlock rod, the rod is substantially strengthened by means of the extended width of the central web and flanges which also facilitates coupling the channel means to the food processor since the central web and flanges force the rod into the channel as the channel is coupled to the food processor.

It is a primary object of the present invention to provide an improved interlock for operating a control switch which enables the operation of a drive motor of a food processor comprising a removable channel which encloses an interlock rod and a biasing compression spring such that the channel, rod and spring can be removed for cleaning or replacement.

Other objects and advantages of the invention will be apparent from the following description, the accompanying drawings and the appended claims.

DETAILED DESCRIPTION OF THE INVENTION

Figure 1:
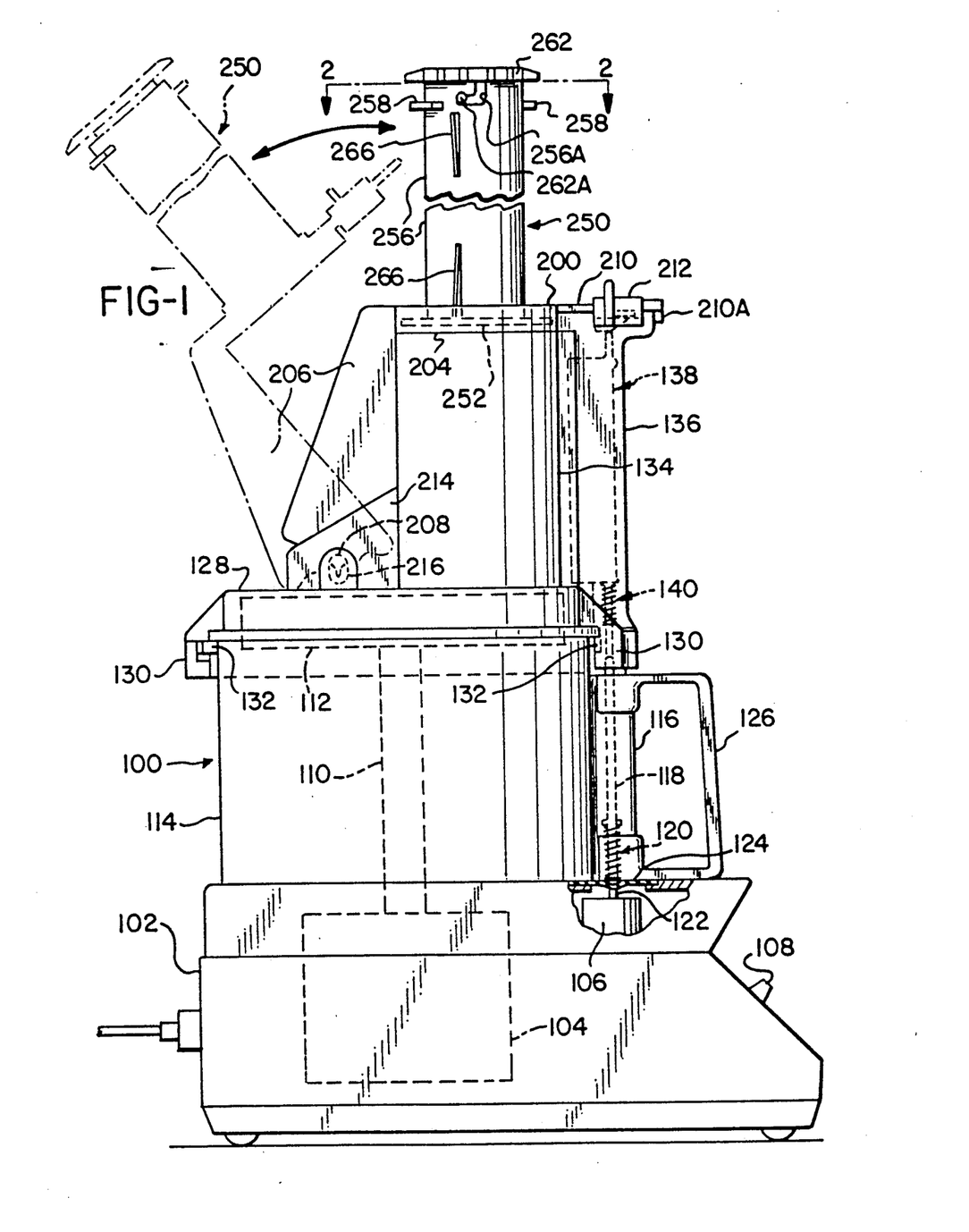
FIG. 1 is a side view of a food processor including the present invention with portions broken away to show internal structure.
Figure 2:
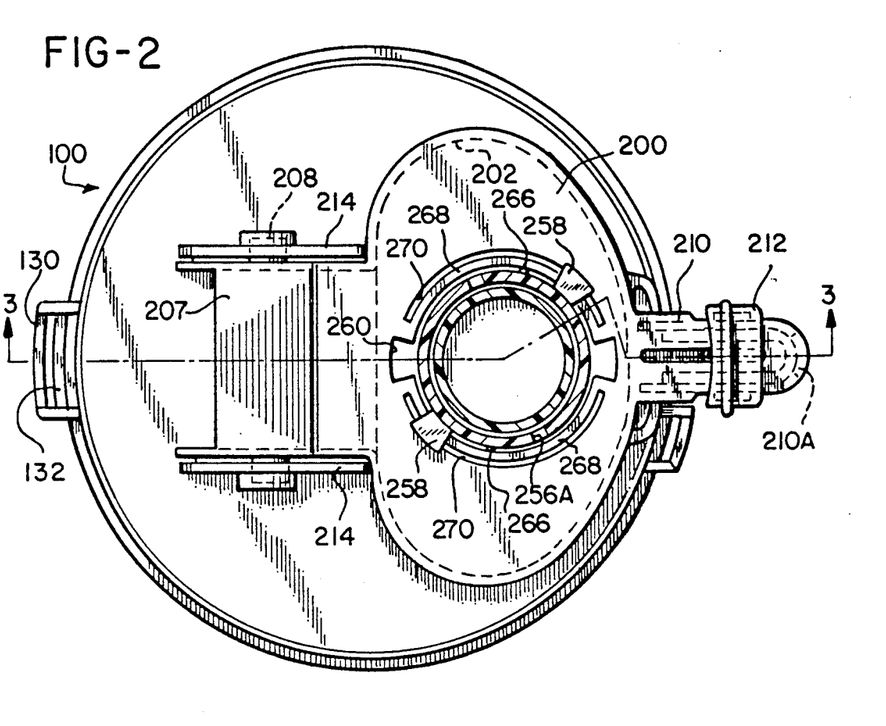
FIG. 2 is a plan view of the bowl cover and feed tube protector of the food processor of FIG. 1.

While the present invention is generally applicable and can be adapted to a variety of food processors, it will be described with reference to a food processor including a pivoting protector for the food processor feed tube as described in U.S. Pat. No. 4,614,306. Referring to FIG. 1, a food processor 100 includes a base 102 for housing an electric drive motor 104 and control means for enabling the actuation of the drive motor 104. In the illustrated embodiment, the control means comprise an electrical interlock switch 106 and operator controls 108 which are enabled to control the drive motor 104 only when the interlock switch 106 is operated. A vertical drive shaft 110 extends upwardly from the base 102 and is driven by the motor 104 to rotate a cutting disk 112 or other interchangeable food processing tool within the upper portion of a working bowl 114. The bowl 114 is removably secured to the base 102 by one of a variety of means well known in the art.

A vertical channel 116 is formed on the side of the bowl 114 to receive a vertically movable interlock activating rod 118 which is normally forced to the upper end of the channel 116 by means of a spring 120. When the bowl 114 is properly positioned and secured to the base 102, the activating rod 118 is aligned with an actuating pin 122 of the interlock switch 106. To prevent contamination of the interlock switch 106 and the interior of the base 102, a resilient membrane 124 covers the switch actuating pin 122. A handle 126 is formed on the working bowl 114 adjacent the channel 116.

The opening of the working bowl 114 is closed by a bowl cover 128 which is removably secured to the working bowl 114 by means of a twist lock arrangement wherein two or more lugs 130 on the bowl cover 128 engage intermating ridges 132 formed around the upper edge of the working bowl 114. Formed into and extending upwardly from the bowl cover 128 is an enlarged feed tube 134 which forms a passageway through the bowl cover 128 for food items to be processed. The feed tube 134 is generally oblong in cross-section and extends from near the center of the cover 128 to near its periphery. The enlarged opening of the feed tube 134 requires a protector to prevent a hand from being inserted into the feed tube and into engagement with the cutting disk 112 or other food processing tool while the food processor 100 is operating.

Channel means comprising a generally U-shaped channel member 136 vertically extends along and is removably connected to the feed tube 134 to house a second vertically movable interlock activating rod 138 which is normally forced to the top of the channel member 136 by means of a compression coil spring 140. It can be seen from FIG. 1 that when the working bowl 114 is properly secured to the base 102 and the bowl cover 128 is properly secured to the working bowl 114, the actuating pin 122 of the switch 106, the interlock activating rod 118 within the channel 116, and the interlock activating rod 138 within the channel member 136 are all vertically aligned with one another. To enable operation of the drive motor 104, the activating rod 138 is depressed against the resilient force of the spring 140 to in turn depress the activating rod 118 against the resilient force of the spring 120 to in turn depress the actuating pin 122 of the switch 106 to enable operation of the drive motor 104 by manipulation of the operator controls 108.

Figure 4:
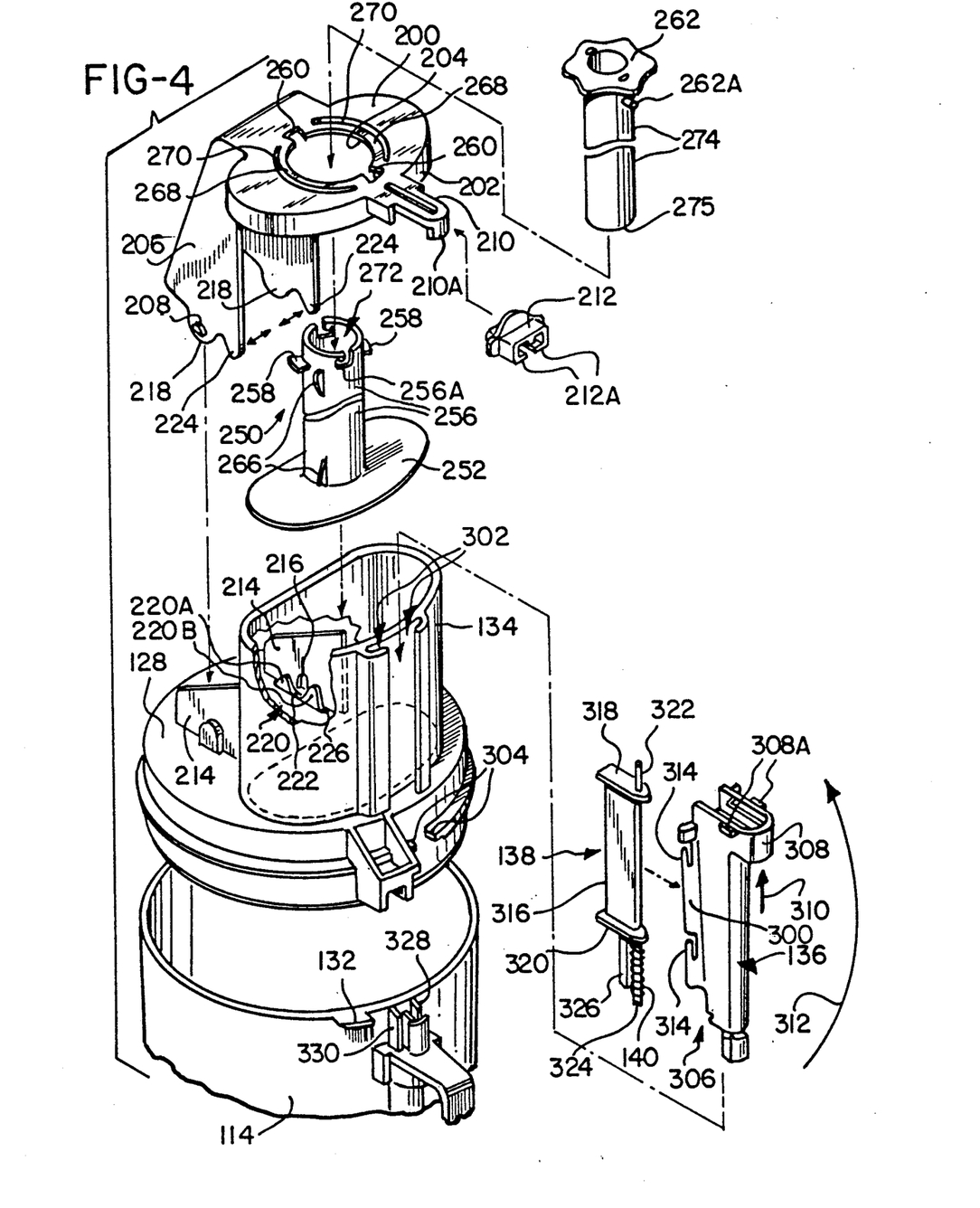
FIG. 4 is an exploded perspective view of the working bowl, the bowl cover and the feed tube protector showing the present invention.
Figure 7:
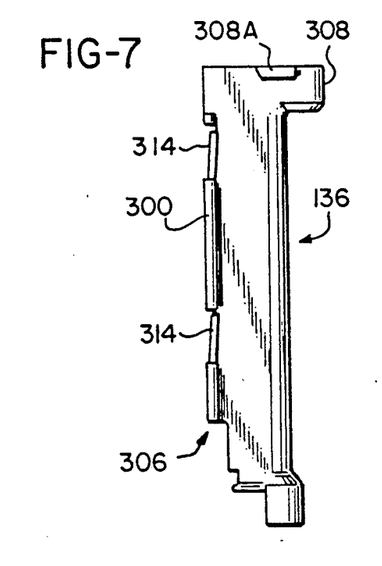
FIGS. 7 and 8 are front and side views of the interlock channel member for the food processor of FIG. 1.
Figure 8:
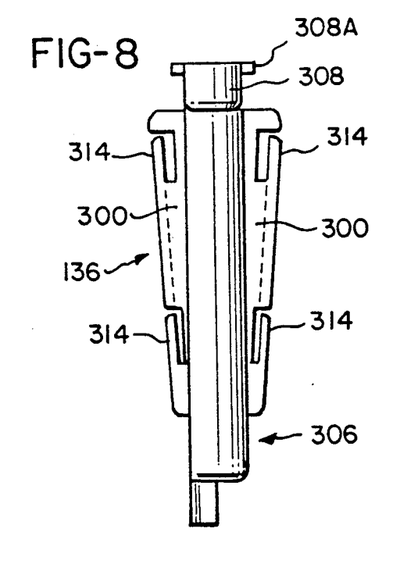

The generally U-shaped channel member 136, as best shown in FIGS. 4, 7 and 8 has flanges 300 which extend outwardly from its open side, and the feed tube 134 of the food processor 100 includes first and second tracks 302 for receiving the flanges 300 to connect the channel member 136 to the feed tube 134, and hence, to the food processor 100. To secure the channel member 136 to the feed tube 134 of the food processor 100, locking tab means comprising locking tabs 304 in the illustrated embodiment are provided at the bottom end of the tracks 302. The channel member 136 includes a notched extension 306 at its lower end for frictionally engaging the locking tabs 304 and an operating extension 308 at its opposite or upper end for operation of the safety interlock.

For assembly to the food processor 100, the channel member 136 is slid into the tracks 302 until the notched extension 306 abuts the locking tabs 304. The channel member 136 is then forced downwardly until the notches in the notched extension 306 engage the locking tabs 304.

For removal of the channel member 136 from the feed tube 134 of the food processor 100, the notched extension 306 is disengaged from the locking tabs 304 by a rocking action of the channel member 136 created by applying an upward force indicated by an arrow 310 to the operating extension 308. The force 310 tends to rotate the channel 136, as shown by the arrow 312, to move the notched extension 306 slightly away from the locking tabs 304 to facilitate disengaging the notched extension 306 from the locking tabs 304 to allow removal of the channel member 136 by sliding upwardly in the tracks 302.

To facilitate engagement and disengagement of the notched extension 306 and the locking tabs 304, and to reduce relative vibration between the channel 136 and the feed tube 134 when the food processor 100 is operating, the flanges 300 include offset snugging fingers 314 which extend beyond the front surfaces of the flanges 300 to engage the tracks 302. The snugging fingers 314 frictionally engage the tracks 302 to stabilize the channel member 136 within the tracks 302, yet allow movement of the flanges 300 within the tracks 302 which permits the slight rocking or pivotal movement of the channel member 136 to facilitate assembly and removal of the channel member 136 for cleaning or repair purposes. It should be apparent that the snugging fingers 314 could extend beyond the back or beyond both the back and front surfaces of the flanges 300.

The interlock rod 138 which is nested within the channel member 136 preferably comprises a central web portion 316 having an upper centering flange 318 and a lower centering flange 320. The upper and lower flanges 318, 320 are shaped to generally correspond to the interior of the channel member 136. A first pin 322 extends upwardly from the upper flange 318 and a second pin 324 extends downwardly from the second flange 320. The second pin 324 is sized to receive the spring means which preferably comprises the compression coil spring 140, and has a lower concave end for engaging the upper end of the interlock rod 118. A bolt 326 also extends downwardly from the lower flange 320 in alignment with the pin 324, but spaced therefrom.

The interlock rod 138 is substantially strengthened by means of the extended width of the central web 316 and the upper and lower flanges 318, 320, which also facilitate coupling the channel member 136 with the interlock rod 138 and spring 140 therewithin to the tracks 302 of the feed tube 134 of the food processor 100. If a straight rod was used in place of the interlock rod 138, it would have to be placed toward the closed end of the channel substantially in alignment with the pins 322 and 324. In this position, a straight rod would tend to move within the channel 136. The central web 316 and upper and lower flanges 318, 320, being dimensioned to fit within the channel 136, maintain the interlock rod 138 within the channel member 136 by engagement with the feed tube 134 as the channel member 136 is fitted into and slid downwardly in the tracks 302 of the feed tube 134.

With this arrangement, a safety interlock for operating a control switch in a food processor permits an enclosed interlock rod and the enclosing channel to be thoroughly cleaned and further provides for the replacement of the channel, the interlock rod or biasing spring in the event one of these parts becomes damaged or worn during the life of the food processor. While the removable interlock arrangement has only been shown for the interlock rod 138 on the feed tube 134 in the illustrated embodiment, it should be apparent that a removable interlock arrangement could also be used on the bowl 114.

A feed tube cover 200 includes a depending skirt 202 which abuts the upper end of the feed tube 134 of the food processor 100 when the feed tube cover 200 is in the closed position over the feed tube 134. The feed tube cover 200 includes a central opening or aperture 204 (see FIG. 4) which is sufficiently small to prevent the insertion of a hand into the feed tube 134 when the feed tube cover 200 is in the closed position over the feed tube 134.

Elongated hinge members 206 are interconnected by a web 207 and extend downwardly from the feed tube cover 200. Hinge pins 208 extend from the outer surfaces of the elongated hinge members 206 near the lower ends of the hinge members 206. A tab 210 extends from the forward edge of the cover 200 and terminates in a downwardly extending projection 210A. The tab 210 receives a movable latching member 212 which together with the projection 210A serve to secure the feed tube cover 200 to the feed tube 134 as will become apparent.

Hinge brackets 214 extend from the upper surface of the bowl cover 128 and include openings or keyway slots 216 formed on the inner sides thereof. The upper ends of the keyway slots 216 are rounded to conform to the upper surfaces of the hinge pins 208 of the elongated hinge members 206. The hinge members 206 are formed of a sufficient thickness of an appropriate plastic material such that they ar somewhat resilient. The hinge members 206 thus may be gripped by an operator's hand and squeezed together to deform the hinge members 206 toward one another such that the hinge pins 208 can be engaged with or disengaged from the keyway slots 216 in the hinge brackets 214 to connect or disconnect, respectively, the feed tube cover 200 and the bowl cover 128.

To support the feed tube cover 200 for hinged movement between a closed position over the feed tube 134, as shown in solid lines in FIG. 1, and a retracted position pivoted away from the feed tube 134, as shown in dash-dot lines in FIG. 1, the lower ends of the elongated hinge members 206 include rounded supporting surfaces 218. Feed tube cover support blocks 220 (see FIGS. 3 and 4) are positioned on the inside surfaces of the hinge brackets 214 adjacent the keyway slots 216 and define rounded bearing surfaces 222 for receiving the rounded supporting surfaces 218 of the elongated hinge members 206.

The feed tube cover support blocks 220 also define stops 220A and 220B which are engaged by corresponding surfaces 206A and 206B of the elongated hinge members 206 for defining the opened and closed positions of the feed tube cover 200, respectively. To prevent removal of the feed tube cover 200 when in the closed or operating position over the feed tube 134, the elongated hinge members 206 include depending fingers 224 which engage mating holes 226 formed into the upper surface of the bowl cover 128.

A primary food pusher 250 is coupled to the feed tube cover 200 such that it is aligned with the feed tube 134 for reciprocating motion therein when the feed tube cover 200 is in its closed position over the feed tube 134. The food pusher 250 comprises a pusher plate 252 which is sized to slidingly fit within the feed tube 134 for pushing food therethrough. A pusher shaft 256 is fixedly connected to the pusher plate 252 and is sized to be received through the centralized opening or aperture 204 in the feed tube cover 200.

To ensure that the pusher plate 252 does not engage the cutting disk 112 or other processing tool within the upper extremities of the working bowl 114, tabs 258 are formed to extend from the outer surface of the upper end of the pusher shaft 256. The tabs 258 are sized and positioned to be received within the notches 260 formed in the edges of the central aperture 204 through the feed tube cover 200. The pusher shaft 256 must be rotated to a position where the pusher plate 252 is not aligned with the feed tube 134 for the tabs 258 to be aligned with the notches 260 such that the pusher shaft 256 can be inserted upwardly through the central aperture 204. The pusher shaft 256 is then rotated to align the pusher plate 252 with the feed tube 134 when the feed tube cover 200 is moved to the closed position over the feed tube 134. Thus positioned, the tabs 258 engage the upper surface of the feed tube cover 200 when the primary food pusher 250 is lowered into the feed tube 134, as shown by the dash-dot lines in FIG. 3. In this way, the tabs 258 ensure that the pusher plate 252 is supported a slight distance above the cutter disk 112 or other food processing tool to prevent damage to the food processor 100.

A pusher head 262 which is larger than the central aperture 204 through the feed tube cover 200 is connected to the pusher shaft 256 on the upper side of the feed tube cover 200 for operation of the primary food pusher 250. Preferably, the pusher head 262 is removably connected to the pusher shaft 256 to enable disassembly of the primary food pusher 250 from the feed tube cover 200 for cleaning purposes. The pusher head 262 is connected to the food pusher shaft 256 by means of pins 262A which engage notched slots 256A formed in the upper end of the food pusher shaft 256. This bayonet mounting arrangement permits the pusher head 262 to be secured to or freed from the pusher shaft 256 by relative twisting motions.

To facilitate operation of the food processor including the pivoting feed tube protector 200, the primary food pusher 250 and the feed tube cover 200 include pusher support means for retaining the primary food pusher 250 at one or more positions relative to the feed tube cover 200. For example, it is desirable to retain the primary food pusher 250 in a raised position, with the pusher plate 252 adjacent the underside of the feed tube cover 200 to facilitate pivotal movement of the feed tube cover 200 between the closed and opened positions. The raised position of the primary food pusher 250 is shown in FIGS. 1 and 3.

The support means comprises interference means which in the illustrated embodiment form elongated ramped projections 266 which extend axially along the outer surface of the pusher shaft 256 at two diametrically opposed locations. Of course, additional projections could be provided as desired. Compression spring means for engaging the projections 266 are formed adjacent and substantially surrounding the centralized aperture 204 through the feed tube cover 200. In the illustrated embodiment, the compression spring means comprise two single leaf springs 268 which are formed by corresponding narrow bands 270 of voids in the material forming the feed tube cover 200, with the narrow bands 270 being parallel to and spaced from the opening 204. The narrow bands 270 are originally formed into the feed tube cover 200 during its molding operation, or may be machined or otherwise cut from the feed tube cover as will be apparent to those skilled in the art.

The projections 266 are sized to frictionally engage and compress the single leaf compression springs 268 to support the primary food pusher 250, yet permit the primary food pusher 250 to be moved relative to the feed tube cover 200 by application of a sufficient force on the primary food pusher 250. The lower set of projections 266, as shown in FIG. 1, retain the primary food pusher 250 in its raised position to facilitate pivotal movement of the feed tube cover 200 between the closed and opened positions, as noted above.

Figure 3:
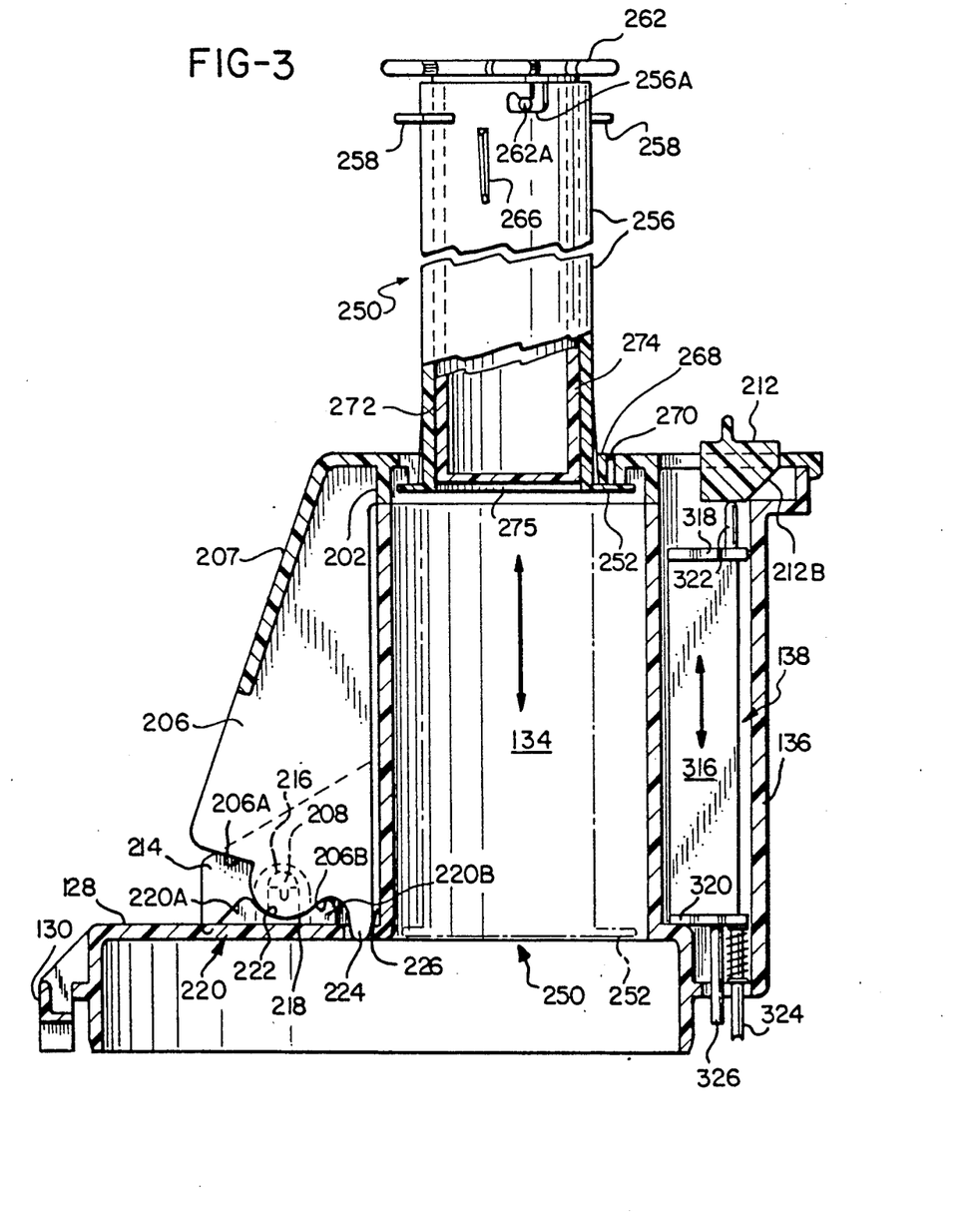
FIG. 3 is a partially sectioned side view of the bowl cover and feed tube protector of the food processor of FIG. 1 taken along the section line 3—3 of FIG. 2.

In the preferred embodiment of the primary food pusher 250, the pusher shaft 256 is hollow and open at both ends, with the opening through the pusher shaft 256 extending through the pusher plate 252, as shown in FIG. 3. The hollow pusher shaft 256 thus defines a reduced diameter secondary feed tube 272 through the food pusher 250 when the hollow pusher shaft 256 is coupled to the feed tube cover 200 in its lowered position and the pusher head 262 has been removed therefrom. In the illustrated embodiment, the pusher head 262 comprises a secondary shaft 274 which extends from the pusher head 262 and is sized to be slidingly received within the hollow pusher shaft 256.

The secondary shaft 274 of the pusher head 262 extends through the hollow pusher shaft 256 such that the closed lower end 275 of the secondary shaft 274 completes the food pushing surface of the pusher plate 252 as best seen in FIG. 3. The secondary shaft 274 of the pusher head 262 is inserted into the hollow pusher shaft 256, with the pusher head 262 being secured to the pusher shaft 256 by means of the extensions 262A engaging the notched slots 256A formed in the upper end of the food pusher shaft 256 to form the primary food pusher 250 which is reciprocated within the feed tube 134. When the pusher head 262 is disconnected from the hollow food pusher shaft 256, the closed shaft 274 of the pusher head 262 may be withdrawn from the hollow pusher shaft 256 to access the secondary feed tube 272 and reinserted thereinto for use as a secondary food pusher.

The projections 266 at the lower end of the pusher shaft 256 engage and compress the leaf springs 268 with sufficient force to retain the primary food pusher 250 in its raised position for pivotal movement of the feed tube cover 200 between the closed and opened positions, yet permit the food pusher 250 to be returned to its food pushing actions within the feed tube 134 by the application of a sufficient force on the primary food pusher 250 as previously noted. In an identical manner, the projections 266 at the upper end of the pusher shaft 256 engage the single leaf springs 268 when the food pusher 250 is in its lowered position to facilitate use of the secondary feed tube 272 through the primary food pusher 250. If the primary food pusher 250 is not retained in its lowered position by means of engagement of the upper projections 266 with the single leaf springs 268, food being processed tends to force the primary food pusher 250 upwardly in the primary feed tube 134, which reduces the ease of use, efficiency and the food processing performed on food introduced into the processor through the secondary feed tube 272.

The latching member 212 serves to secure the feed tube cover 200 in its closed position over the feed tube 134 by being pulled or slid toward the distal end of the tab 210. As the latching member 212 slides toward the end of the tab 210, flanges 212A engage extensions 308A on the operating extension 308 of the channel member 136. As best seen in FIG. 3, a cam surface 212B depresses the interlock activating rod 138 which, in turn, depresses the interlock activating rod 118 to operate the switch 106 via the activating pin 122 if the bowl 114 is properly coupled to the base 102, the bowl cover 128 is fully engaged with the bowl 114 and the feed tube cover 200 is in the closed position over the feed tube 134. The interlock activating rod 138 is held in its depressed position by the underside of the rib, the forward edge of which defines the cam surface 212B.

Figure 5:
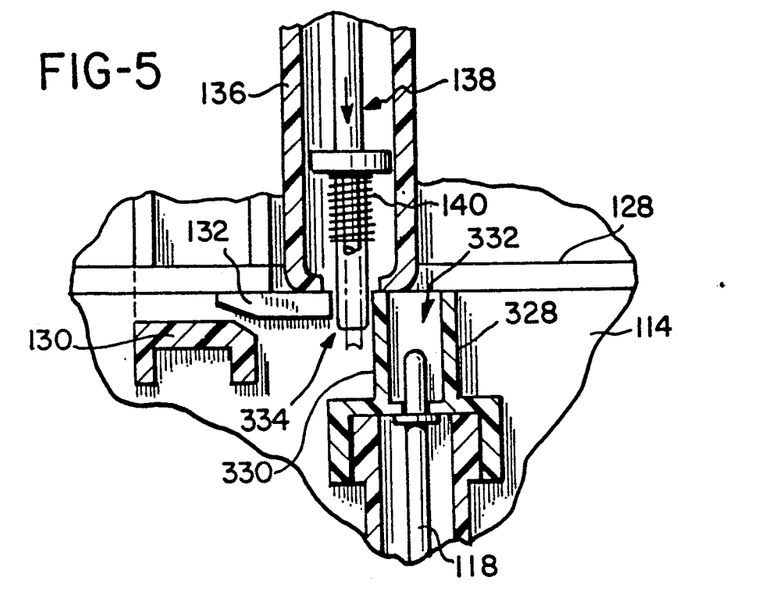
FIGS. 5 and 6 show coupling the bowl cover to the bowl in child-lock and operating positions, respectively.
Figure 6:
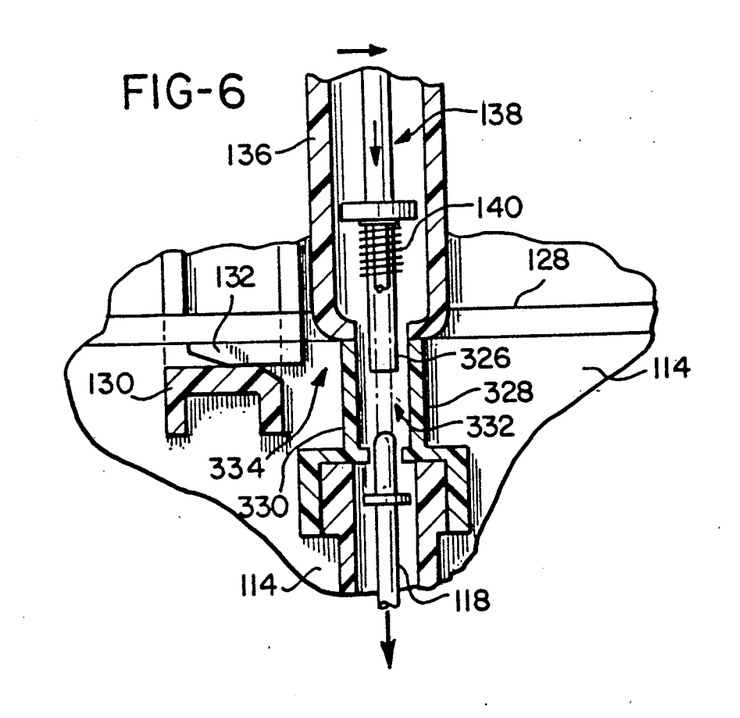

As the interlock rod 138 is depressed, it will be noted that the bolt 326 extends out the bottom of the channel 138 as best shown in FIGS. 3, 5 and 6. The working bowl 114 includes bowl cover positioning means for defining a first food processor operating position for the bowl cover 128 relative to the bowl 114 as shown in FIG. 6, and a second child-lock position for the bowl cover 128 relative to the bowl 114 as shown in FIG. 5. The interlock means which are activated by the latch 212 operate the control means to enable the operation of the drive motor only when the bowl 114 and the bowl cover 128 are in the first position, and the bowl 114 and the bowl cover 128 and feed tube cover 200 are properly secured to one another and to the base 102.

The bowl positioning means comprises first and second walls 328 and 330 and an adjacent one of the ridges 132 which serves to couple the bowl cover 128 and the bowl 114. The first and second walls 328 and 330 define the first or operating position of the bowl cover 128 relative to the bowl 114, and form a socket 332 which receives the bolt 326 when the interlock is activated by means of the latch 212. Receipt of the bolt 326 in the socket 332 defined by the walls 328 and 330 also prevents the bowl cover 128 from moving sufficiently relative to the bowl 114 due to vibration of the food processor as it operates to release the interlock. The feed tube cover 200 is also prevented from being moved from its closed position by means of the downwardly extending projection 210A which engages the outer end of the extension 308 on the channel 136.

Operation of the food processor with the bowl cover 128 in the first position relative to the bowl 114 is substantially as in the prior art. The second position defined by the second wall 330 and the ridge 132 adjacent thereto, however, defines a child-lock position to prevent contact with sharp portions of the food processing tool contained within the bowl 114 when the food processor is not being operated.

If the bowl cover 128 is moved to the second position relative to the working bowl 114 and the interlock is activated by means of moving or sliding the latch 212 toward the end of the extension 308, the bolt 326 will be extended out the bottom of the channel 136 and into a socket 334 defined between the second wall 330 and the ridge 132. In this second position, the feed tube cover 200 is secured to the bowl cover 128 by means of the latch 212, and the bowl cover 128 is in turn secured to the bowl 114 by means of the engagement of the bolt 326 with the socket 334 defined between the second side wall 330 and the ridge 132.

While this child-lock position can be rapidly released and the feed tube cover 128 fully closed to the first operating position relative to the bowl 114 by an adult operator, in the child-lock position, the food processor will not operate and access to a food processing tool or tools mounted within the bowl 114 is precluded for a young child who is unable to manipulate the parts of the food processor to gain access to the bowl 114. Thus, it is apparent that the child-lock position, as illustrated, will permit one or more food processing tools to be stored in the food processor, or will allow the operator of a food processor to more confidently leave the food processor for brief periods of time without the fear of a young child placing a hand into the food processor and hurting themselves by means of the sharp edges on the food processing tools. While this child-lock arrangement is particularly applicable to a food processor including an interlock rod, it will be apparent that the child-lock can also be applied to other food processors wherein an activating rod is extended either from a feed tube cover or from a bowl cover by means of changing the position of the bowl cover relative to the bowl and then operating the interlock.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a food processor having a drive motor and control means for enabling the operation of said drive motor, a safety interlock for operating said control means comprising:
   an axially movable interlock rod aligned with said control means to enable operation of said drive motor upon movement of said rod in a first direction;
   spring means for resiliently forcing said interlock rod in the direction opposite to said first direction;
   channel means comprising a generally U-shaped member for receiving said interlock rod and having flanges outwardly extending from its open side; and
   means defining first and second tracts for receiving said flanges to connect said channel removably to said food processor whereby said interlock rod and spring means can be removed for cleaning or replacement.

2. A safety interlock for a food processor as claimed in claim 1 wherein said food processor further comprises locking tab means at one end of said tracks and said channel means further comprises a notched extension at one end for frictionally engaging said locking tab means and an operating extension at its opposite end for operation of safety interlock, said notched extension being disengaged from said locking tab means for removal of said channel means by applying force to said operating extension.

3. In a food processor having a drive motor and control means for enabling the operation of said drive motor, a safety interlock for operating said control means comprising:
   an axially movable interlock rod for operating said control means to enable operation of said drive motor upon movement of said rod in a first direction;
   spring means for resiliently forcing said interlock rod in the direction opposite to said first direction; and
   channel means for receiving said interlock rod and said spring means with said interlock rod being properly aligned with said control means, said channel means being removably connected to said food processor whereby said interlock rod and spring means can be removed for cleaning or replacement;
   wherein said channel means comprises a generally U-shaped member having flanges outwardly extending from its open side, and said food processor includes first and second tracks for receiving said flanges to connect said channel means to said food processor;
   wherein said food processor further comprises locking tab means at one end of said tracks and said channel means further comprises a notched extension at one end for frictionally engaging said locking tab means and an operating extension at its opposite end for operation of said safety interlock, said notched extension being disengaged from said locking tab means for removal of said channel means by applying force to said operating extension; and
   wherein said flanges include offset fingers extending beyond one or both surfaces of said flanges to stabilize said flanges within said tracks to reduce relative vibration between said channel means and said food processor.

4. A safety interlock for a food processor as claimed in claim 3 wherein said interlock rod comprises:
 a central web portion having upper and lower centering flanges thereon, said upper and lower flanges being shaped to generally correspond to the interior of said channel means;
 a first pin extending upwardly from said upper flange; and
 a second pin extending downwardly from said second flange, said second pin being sized to receive said spring means which comprises a compression coil spring whereby said interlock rod is substantially strengthened and facilitates coupling said channel means to said food processor.

* * * * *